US009169875B2

(12) United States Patent
Shibuya

(10) Patent No.: US 9,169,875 B2
(45) Date of Patent: Oct. 27, 2015

(54) LINEAR MOTION GUIDE SYSTEM UNIT

(71) Applicant: NIPPON THOMPSON CO., LTD., Tokyo (JP)

(72) Inventor: Yuichi Shibuya, Tokyo (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 14/296,970

(22) Filed: Jun. 5, 2014

(65) Prior Publication Data

US 2015/0010253 A1 Jan. 8, 2015

(30) Foreign Application Priority Data

Jul. 4, 2013 (JP) .................. 2013-140963

(51) Int. Cl.
*F16C 33/76* (2006.01)
*F16C 29/06* (2006.01)
*F16C 33/78* (2006.01)

(52) U.S. Cl.
CPC ......... *F16C 33/7823* (2013.01); *F16C 29/0609* (2013.01); *F16C 29/0638* (2013.01)

(58) Field of Classification Search
CPC ............... F16C 29/086; F16C 29/0609; F16C 29/0638; F16C 33/7823
USPC ........................................................ 384/15
See application file for complete search history.

(56) References Cited

U.S. PATENT DOCUMENTS

| 5,149,205 A * | 9/1992 | Tsukada .......................... 384/15 |
| 5,399,023 A * | 3/1995 | Winkelmann et al. ........... 384/13 |
| 5,553,944 A * | 9/1996 | Osawa et al. .................... 384/15 |
| 7,789,564 B2 * | 9/2010 | Keller et al. .................... 384/15 |
| 8,696,204 B2 * | 4/2014 | Ooga ............................... 384/15 |
| 2008/0131036 A1 * | 6/2008 | Keller et al. .................... 384/15 |

FOREIGN PATENT DOCUMENTS

| JP | 2002-266858 A | 9/2002 |
| JP | 2011-247359 A | 12/2011 |

* cited by examiner

*Primary Examiner* — Alan B Waits
(74) *Attorney, Agent, or Firm* — Browdy and Neimark, PLLC

(57) ABSTRACT

A lip portion of an end seal is born against a metallic core to make no interference against an end cap. The metallic core controls deformation of the lip portion to improve the close engagement of the lip portion with a guide rail. The lip portion is composed of an outside lip extending outwards and an inside lip extending inwards of the slider. A root portion where the inside and outside lips are merged together is secured to the metallic core in such a relation that the metallic core bears stress exerted on respective center lines of the outside and the inside lips. The metallic core is composed of a mounting portion having a mounting surface, a bent portion extending widthwise of the slider and biased or deflected more outward of the slider to prevent the lip portion from make any interference with the end cap.

8 Claims, 11 Drawing Sheets

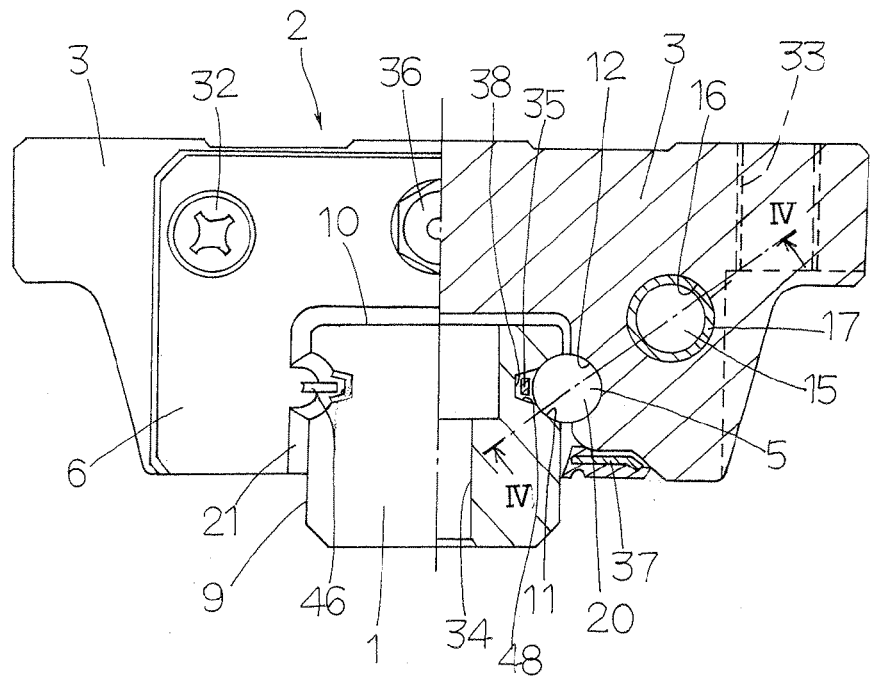

LINEAR MOTION GUIDE SYSTEM UNIT

FIELD OF THE INVENTION

The present invention relates to a linear motion guide unit composed of a guide rail and a slider that fits over or conforms to the guide rail for linear movement relative to the guide rail. More particularly, it relates to a linear motion guide unit with an end seal that is effective to exclude foreign matter.

BACKGROUND OF THE INVENTION

Modern linear motion guide units in recent years are demanded to increasingly improve the highly-tight sealing performance to keep any foreign matter away from entering inside the slider, ensuring maintenance-free operation for lubricant and coping with high-speed sliding movement of the slider. Thus, with the conventional linear motion guide units, the end seal equipped on the slider is designed to increase the interference for sealing or have a double lip-type construction composed of inward and outward seals. One of the prior linear motion guide units as shown in FIG. 22 (A) has a guide rail 1 and a slider 2P that is allowed to move relative to the guide rail through rolling elements. The slider 2P is composed of a carriage, end caps 4P secured on lengthwise ends of the carriage, one to each ends, and end seals 6P arranged on outward end surfaces 14P of the end caps 4P. The end seals 6P are each composed of an elastic member 7P and a metallic core 8P serving as a skeleton of the end seal 6P to reinforce or bear the elastic member 7P. With the elastic member 7P, there is provided the double lip-type sealing construction 19P made up of an outside lip 21P extending outward of the slider 2P to make sliding engagement with a top surface 10 of the guide rail 1 and an inside lip 22P extending inward of the slider 2P.

There has been already known a linear motion guide system with a sealing device, which is disclosed in, for example Japanese Laid-Open Patent Application No. 2011-247 359. With the prior linear motion guide system, the sealing device is composed of a lip-type seal and a protector to squeeze the lip-type seal to exclude foreign material from between the lip-type seal and the protector while exerting adequate sealing impact on the lips of the seal. A first lip of the lip-type seal is made raised above a major portion of the seal to undergo elastic deformation after the protector has been fastened to the lip-type seal. As a result, the first lip is urged against a surface of a guide rail to make close engagement with the protector around a U-shaped open edge of the protector.

In Japanese Laid-Open Patent Application No. 2002-266 858, there is disclosed another linear motion guide system with a side seal construction, whose a pair of outside and inside lips is protected from any excessive deformation when the sliders moves, so that the linear motion guide system is expected to ensure better sealing quality and retention of lubricant for a prolong period even in worse working environment where much foreign matter occurs. The side seal construction in the prior linear motion guide unit is mounted on one end of the slider with the lips apart from each other to make sliding contact with the outside surface of the guide rail, thereby defining a V-shaped gap between the lips in a travelling direction of the slider. The outward lip serves to exclude dirt and the inward lip retains lubricant inside a space defined with the lips, the surface of the guide rail and the concaved inside surface of the slider. The lips in transverse section are arranged in plane symmetry relative to a plane perpendicular to the outside surface of the guide rail. A core member of the side seal construction is placed in a relation that a center line in thickness direction extends coincidentally with the plane perpendicular to the outside surface of the guide rail into the lips to bear or back the lips. As an alternative of the side seal construction stated earlier, the lips are biased or deflected away from the end cap by a spacer part or bending of the core member to isolate the lips from the end cap to prevent any interference of the lips with the end cap.

With the linear motion guide unit constructed as stated earlier, the outward lip 21P of the double lip-type construction 19P when the slider 2P moves relative to the guide rail 1 as shown in FIG. 22(B) undergoes no deformation because the outward lip 21P is born against the metallic core 8P lying on the center line CL of the outward lip 21P. On the other hand, the inward lip 22P is pressed down against the top surface 10 of the guide rail 1 to collapse so that the lubricant existing on the top surface 10 would leak out of the slider 2P. Thus, the linear motion guide unit constructed as stated earlier has an unsatisfactory result in demand for air-tightness and fails in maintenance-free operation because of leakage of lubricant, with causing an issue of lowering the sliding performance.

Moreover, it is said that the linear motion guide unit cited earlier has the same fault as in the construction described with reference to FIG. 22(B). The elastic lips, as extending long from the metallic core to the leading edge, are liable to bend or warp largely. Thus, the inward lip when suffered to a force opposite to an extending direction of the inward lip undergoes deformation to pose a problem of lubricant leakage. The outward lip is pressed with a protector to undergo the elastic deformation to make the air-tight engagement with the surface of the guide rail, whereas the inward lip is free from any support of a metallic plate and therefore liable to cause any warp when suffered to the external force.

SUMMARY OF THE INVENTION

The present invention, therefore, has as its principal object to overcome the problems stated earlier and, in particular, to provide the linear motion guide unit having a highly-tight sealing unit which is more effective to keep lubricant against leakage out of a slider so as to make sure of maintenance-free operation for lubricant and high-speed sliding movement of the slider relative to the guide rail. More in detail, the present invention is motivated to improve the end seal installed on opposite ends of the slider. The end seals each have an outside lip extending outward of the slider in the sliding direction of the slider and an inward lip extending inward of the slider in the direction opposite to the outward lip. The inward and outward lips at their proximal ends are merged integrally with each other and born together against a metallic core in such relation that their center lines on their transverse sections lie on the metallic core. Moreover, the metallic core warps in the merged proximal end of the lips to bias sidewise the lips to get the deformed lips to avert or sidestep from any interference with the end cap. Thus, the lips are born or supported with the metallic core to be kept against elastic deformation even when suffered to the sliding resistance that would be encountered when the lips slide over the surface of the guide rail, with the result of protecting the lubricant against leakage out of the slider, thereby improving the lubricant-tightness to accomplish long-lasting maintenance-free operation for lubricant, accompanying with increase of sliding velocity of the slider on the guide rail.

The present invention is concerned with a linear motion guide unit, comprising a guide rail having longitudinal sides each of which has a first longitudinal raceway groove, and a slider allowed to move on the guide rail in a sliding manner through more than one roller, the slider having a carriage, end caps and end seals, the carriage having second raceway grooves extending in opposition to the first raceway grooves on the guide rail to define load-carrying races between the first raceway grooves and the second raceway grooves and return passages extending along the second raceway grooves, the end caps being fastened on forward and aft end surfaces of the carriage, one to each end surface, and provided therein with turnaround passages to join together the load-carrying races and the return passages, the end seals being attached on outward end surfaces of the end caps to close clearances between the guide rail and the end caps, and rolling elements which are allowed to roll through circulating circuits made up of the load-carrying races, the return passages and the turnaround passages, and further each of the end seals being composed of a metallic core of metal plate rich in stiffness or rigidity and an elastic member adhered to the metallic core, the elastic member being composed of a major body and lip portion integral with the major body and opposing to the guide rail to come into sliding engagement or contact with a top surface and the longitudinal sides of the guide rail, wherein the end seals each is made of an inverted U-shape plate having a pair of side bulges lying in opposition to the longitudinal sides of the guide rail, one to each side, and an upper connecting portion lying in opposition to the top surface of the guide rail and connecting the side bulges with each other, and further the lip portion has an outside lip extending from the major body outside of the slider and an inside lip extending from the major body inside of the slider to make sliding engagement or contact with the guide rail, the outside lip and the inside lip being united at their pedestals in a root portion in which the metallic core is embedded in such a relation lying on center lines in transverse sections of the outside lip and the inside lip, and wherein the metallic core has holes which are used to fasten the metallic core to the outward end surface of the end cap, a mounting portion lying along the upper connecting portion of the end seal and having a mounting surface to come into abutment against the outward end surface of the end cap, a bent portion lying linearly along the upper connecting portion of the end seal across an overall width of the metallic core, but biased or deflected more outward of the slider, and a lip-support portion lying on a plane biased from the mounting surface and extended from the bent portion along the bulges of the end seal in parallel with the mounting surface, whereby the metallic core bears or supports forces or stress exerted respectively on the center lines of the outside lip and the inside lip.

The outside lip and the inside lip in the end seal are formed along an inward edge of the inverted U-shape plate of the elastic member to come into engagement with the top surface and the sides of the guide rail. The end seal other than the lips is made in the plate defined with opposite surfaces extending in a substantially parallel with each other. The outside lip of the lips is raised outside above an outside surface of opposite surfaces of the plate and the inside lip of the lips is retracted more inwardly than an inside surface of opposite surfaces of the plate.

With the end seal constructed as stated earlier, the metallic core at an innermost end thereof is secured to the root portion of the outside lip and the inside lip to direct the lips to the guide rail, so that the outside lip and the inside lip are born together against the metallic core throughout the inward edge of the elastic member. Moreover, a center line in a thickness of the lip-support portion of the metallic core is out of line with another center line of the root portion where the inside lip and the outside lip are united together and gets biased towards the inside lip.

With the end seal constructed as stated earlier, the lip-support portion of the metallic core is biased or deflected outwards away from the mounting portion to make no abutment against the outward end surface of the end cap and the elastic member has a groove just above the inside lip to isolate or protect the inside lip from interference with the end cap after the inside lip has been suffered to elastic deformation.

With the end seal constructed as stated earlier, the outside lip on the end seal is thicker in transverse section than the inside lip, thereby tougher in elastic deformation than the inside lip. Moreover, inclined angles or tilt angles ($\alpha_1$, $\alpha_2$) along a sole surface and an upper surface of the outside lip are set identical with inclined angles or tilt angles ($\beta_1$, $\beta_2$) along a sole surface and an upper surface of the inside lip, respectively.

With the linear motion guide unit in which both the outside lip and the inside lip are born or supported against the single metallic core, the inside lip born against the metallic core is more in the interference with the guide rail than ever to enhance the tightness so as to keep the lubricant against leakage out of the slider to accomplish long-lasting maintenance-free operation for lubricant, with accompanying with increase of sliding velocity of the slider on the guide rail. The metallic core especially is composed of the mounting portion having a mounting surface to come into abutment against the outward end surface of the end cap, a bent portion lying linearly across an overall width of the metallic core, but biased or deflected more outward of the slider, and a lip-support portion lying on a plane biased from the mounting surface and extended from the bent portion along the bulges of the end seal in parallel with the mounting surface. The metallic core constructed as stated just above makes possible the simple structure of the lip portion having the outside lip and the inside lip, further making not only the metallic core itself but the lip portion durable and easier to manufacture them. Moreover, the elastic body of the end seal, because of made in simple flat member having opposite sides lying parallel with each other, is simple in construction and easier to be processed.

The bent portion to bias or deflect the metallic core in the fore-and-aft direction of the slider makes it possible to extend the metallic core up to the root portion of the inside lip to support at the end thereof the inside lip, further making it possible to set identical the inclined angles or tilt angles along the sole surface and the upper surface of the outside lip with the inclined angles or tilt angles along the sole surface and the upper surface of the inside lip, thereby protecting the inside lip against turning over towards the direction opposite to the normal direction to help the better sealing performance of the inside lip. With the end seal of the present invention, in addition, the inside lip elastic member born or supported with the metallic core is more in the interference with the guide rail than the prior lip to enhance the tightness so as to keep the lubricant against leakage out of the slider to accomplish long-lasting maintenance-free operation for lubricant, with accompanying with increase of sliding velocity of the slider on the guide rail. Moreover, the foremost edge of the metallic core extends nearby the edge of the lip portion to support the inside lip to give an adequate strength and resistance to the lip portion of elastic member. As the result of the construction as stated just earlier, the lip portion is tougher to suffer the pulling force which would be caused by the sliding resistance occurring between the lip portion and the surface of the guide rail owing to the interference of the seal, so that the lip portion is protected from tuning over towards the direction opposite to the normal direction.

The end seal of the present invention is made in the construction that the lubricant is hard to creep along the surface of the guide rail. The inside lip, because of the root portion thereof being born against the metallic core, is tougher to be suffer deformation to keep close engagement with the surface of the guide rail. Thus, the inside lip scrapes off the lubricant existing inside the slider on the surface of the guide rail to prevent the lubricant from leaking out of the slider. That is, the lubricant because of tough to leak out of the slider may remains a certain extent enough not to reduced to lubrication starvation, thereby preventing useless consumption of the lubricant as well as atmosphere contamination. The linear motion guide unit constructed as stated earlier, when used with grease of the type less in airborne dust, would be preferred for clean environment. Moreover, the linear motion guide unit of the present invention is preferred for less consumption of lubricant and long-lasting operation. With the linear motion guide unit of the present invention, moreover, the end seal can be fastened firmly to the slider, because the metallic core is biased or deflected at the mounting portion thereof towards the outward end surface of the slider to make it easier to squeeze the fastening bolts into the end cap through bolt holes in the mounting portion. Further, the metallic core constructed as stated earlier, since hard to suffer the deformation against the external force in the bent direction, makes certain of required mechanical strength while making less in thickness to attempt weight reduction. The groove on the end seal formed near the inside lip is expected to serve as an oil reservoir to temporarily retain lubricant which is collected by the inside lip and transferred into the groove through a space formed around the lip portion.

BRIEF DESCRIPTION OF THE DRAWINGS

FIG. 3 is a view in front elevation of the linear motion guide of the present invention, but in which only a right half thereof is shown in transverse view.

FIG. 4 is a view in transverse section of the linear motion guide unit of FIG. 3, the view being taken on a plane lying on the line IV-IV of FIG. 3.

In FIG. 21(A) the end seal is shown at rest before starting to move and in FIG. 21(B) there is illustrated how the inside lip scrapes off lubricant from the surface of the guide rail, In FIG. 22(A) the end seal is shown at rest before starting to move and in FIG. 22(B) the end seal is shown after starting to move, in which the lubricant adhered to the surface of the guide rail leaks out through under the inside lip deformed by sliding resistance, instead of scraped off from the surface of the guide rail.

DETAILED DESCRIPTION OF THE PREFERRED EMBODIMENTS

Figure 1:
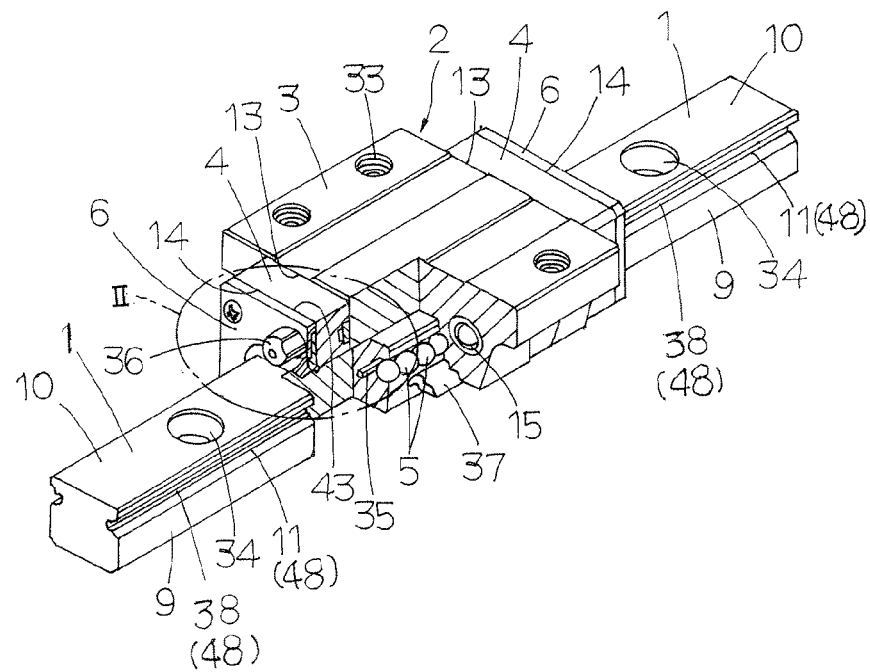
FIG. 1 is a view in perspective, partially broken away, showing a preferred embodiment of a linear motion guide unit equipped with balls of two-row rolling contact type according to the present invention.
Figure 2:
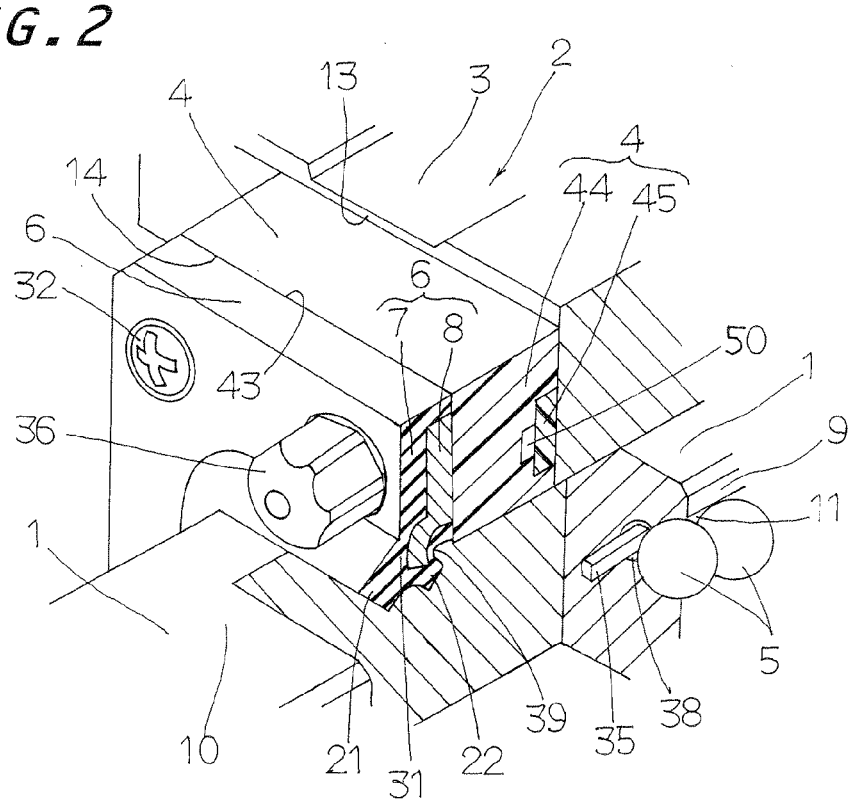
FIG. 2 is an enlarged fragmentary and partially cutaway view in perspective to show in detail a part encircled with II in FIG. 1
Figure 5:
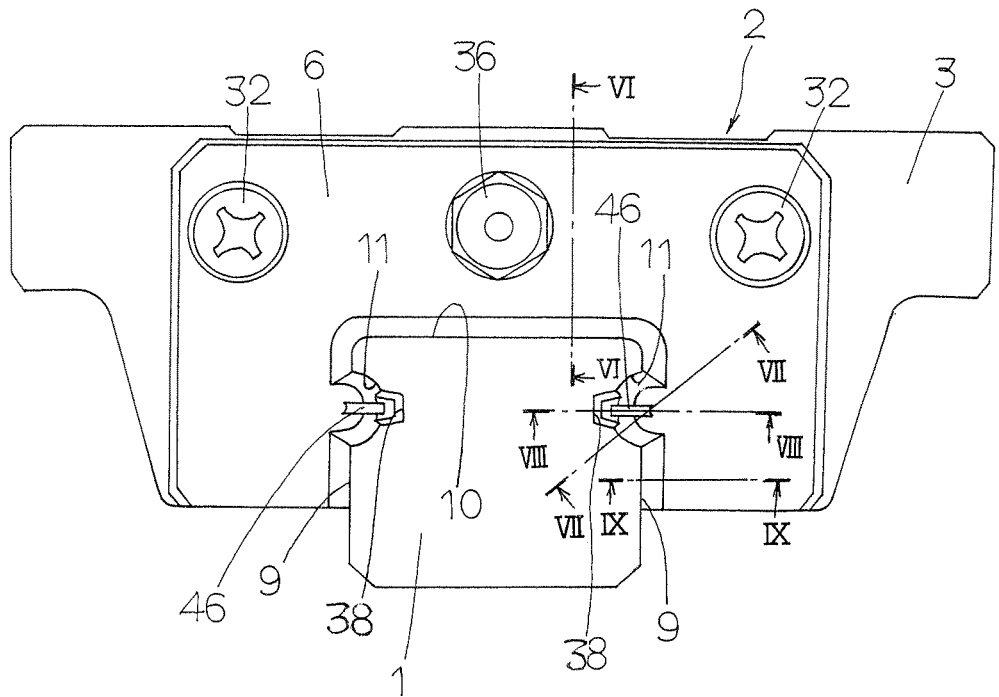
FIG. 5 is a view in front elevation of a linear motion guide unit constructed according to the present invention.

The linear motion guide unit according to the present invention is adapted for use in any relatively sliding components in machinery as diverse as machine tools, various assembling machines, conveyors, robotic machines, semiconductor fabricating equipment, precision machines, measurement/inspection instruments, medical machines, micromachines and so on. Especially, the linear motion guide unit of the present invention features the end seal having lips to improve the sealing property for lubricant. Preferred embodiments of the linear motion guide unit constructed according to the present invention will be described in detail by reference to the drawings.

The linear motion guide unit of two-row rolling contact ball type according to the present invention as shown in FIGS. 1 to 4 is mainly composed of an elongated guide rail 1 having deep-grooves 48 on lengthwise sides 9 thereof and raceway grooves or first raceway grooves 11 extending along the deep grooves 48, and a slider 2 that fits over or conforms to the guide rail 11 to move in a sliding manner relative to the guide rail 1 through a plurality of rolling elements 5. The slider 2 is in general comprised of a carriage 3 having thereon raceway grooves or second raceway grooves 12 lying in opposition to the raceway grooves 11 on the guide rail 1 to define load-carrying races 20 between them and having therein non-loaded return passages 15 lying in parallel with the load races, end caps 4 secured to forward and aft ends 13 of the carriage 3, one to each end, and provided therein with non-loaded turnaround passages 30 to connect the load-carrying races 20 with the return passages 15, and end seals 6 attached on outward ends 49 of the end caps 4 to close clearances between the guide rail 1 and the slider 2. More than one ball 5 is allowed to roll through circulating circuits 40 composed of the load-carrying races 20, return passages 15 and their associated turnaround passages 30. With the linear motion guide unit constructed as stated earlier, the guide rail 1 is, for example, about 12 mm wide and the end seal 6 is made up of a core member 8 of metallic plate rich in rigidity or stiffness and elastic member 7 secured to the metallic core 8. The elastic member 7 includes a major body 18 and a lip portion 19 integral with the major body 18. The lip portion 19 is formed to extend over a concaved inside peripheral edge of the end seal 6 to make close contact sliding engagement with all the lengthwise sides 9 and a top surface 10 of the guide rail 1. The lip portion 19 of the end seal 6 has a thickness, or a thickness B lying between the outermost edge of an outside lip 21 and the innermost edge of the inside lip 22, larger than a thickness b of the major body 18 of the end seal 6.

With the linear motion guide unit constructed as stated earlier, the lip portion 19 of the end seal 6 is made in a double-lip structure which is mainly composed of the outside lip 21 extending from the major body 18 lengthwise outward out of the slider 2 to make sliding engagement with the guide rail 1, and the inside lip 22 extending from the major body 18 lengthwise inward of the slider 2 to make sliding engagement with the guide rail 1. The slider 2 is formed in an inverted U-shape in a transverse section and the carriage 3 is formed with threaded holes 33 used for fastening the counterpart such as other instruments, works, mounting parts and so on to the slider 2. The end cap 4 has a lubrication port, not shown, and an oiling groove 50 to feed the balls with lubricant which is supplied from a grease nipple 36 arranged on an outward surface of the end seal 6, which is secured on an outward end surface 14 of the end cap 4. With the linear motion guide unit of the present invention, moreover, a sleeve 17 impregnated with the lubricant fits snugly into the return passage 15 in the slider 2 to apply lubricant around the balls while rolling through the circulating circuit 40. The sleeve 17 is fabricated from a porous compact of finely powdery ultrahigh molecular weight synthetic resin, which is first subjected to compacting and then sintering at elevated temperature. The sintered resinous compact product has open-porous or open-cellular texture whose pores or cells preserved among fine particles are open each other through interstices or channels. Lubricant is well absorbed and preserved in the pores or cells in the porous compact or the sleeve 17. On the bottom of the slider 2, there are provided lower seals 14. The return passages 15 are constituted with thorough-holes defined inside the longitudinal sleeves 17 which are inserted in longitudinal holes lying in sidewise bulges of the carriage 3. The end cap 4 has spouts to provide inlet/outlet connectors to connect the turnaround passages 3 with the return passages 15. After the spouts on the end cap 4 have fitted into mating holes 16 in the carriage 3, the turnaround passages 30 make smooth connection with the return passages 15.

Figure 10:
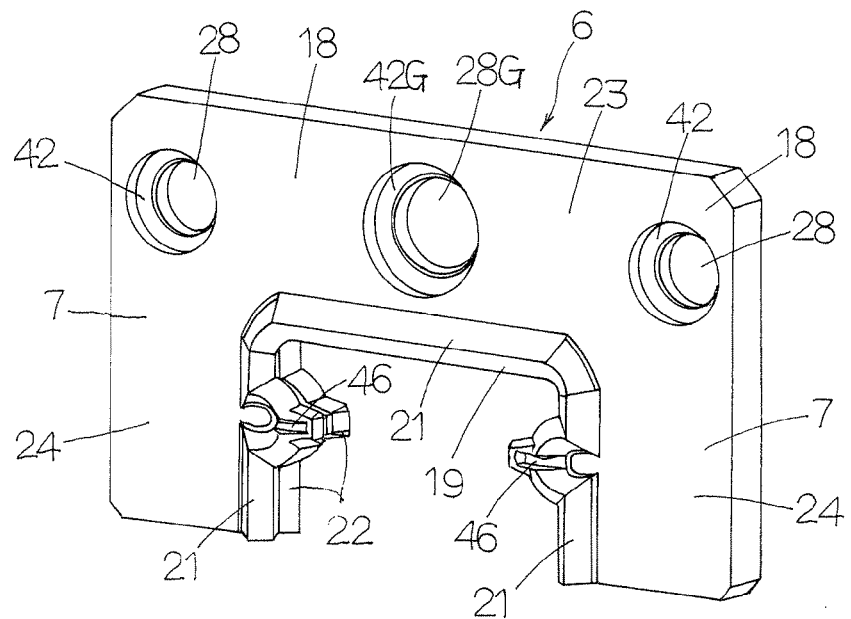
FIG. 10 is a view in perspective showing the end seal to be equipped in the linear motion guide unit of the present invention, the end seal being depicted to show an outside lip in front elevation thereof.
Figure 11:
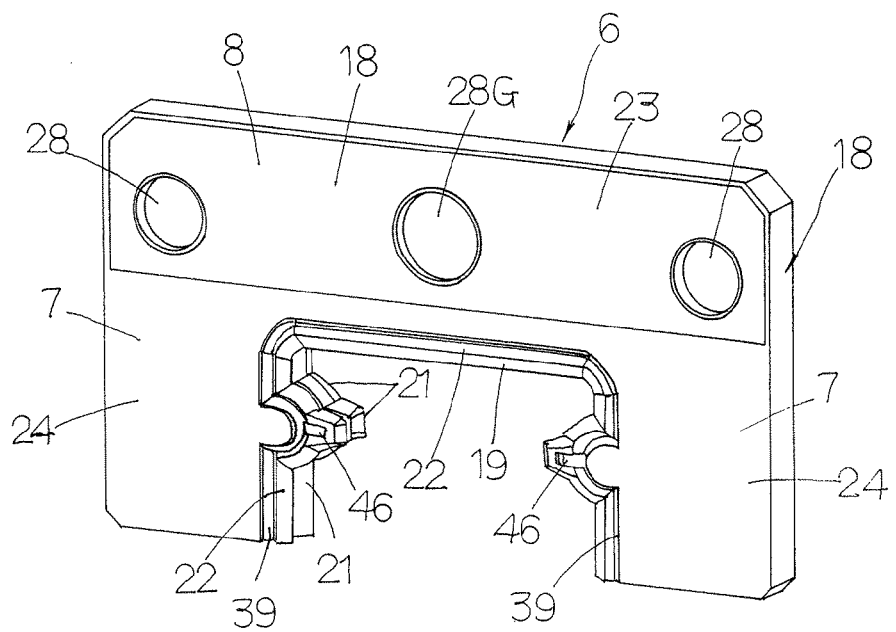
FIG. 11 is a view in perspective showing the end seal to be equipped in the linear motion guide unit of the present invention, the end seal being depicted to show an inside lip in front elevation thereof.

With the linear motion guide unit constructed as stated earlier, the end seal 6 includes an upper connecting portion 23 lying on the guide rail 1, and bulges 24 extending downwards from widthwise opposite ends of the upper connecting portion 23 along the sides 9 of the guide rail 1 to straddle across the guide rail 1. The slider 2 has the end caps 4 and end seals 6 secured together to the carriage 3. More especially, the end caps 4 and the end seals 6 are secured together to the carriage 3 after fastening bolts 32 has extended past holes 28, see FIG. 10, in both the end seal 6 and the end cap 4 and driven into threaded holes, not shown, in the carriage 3. The guide rail 1 has bolt holes 34 formed spaced at preselected intervals in a lengthwise direction on a top surface of the guide rail 1 to fasten the guide rail 1 to other members such as a machine bed, basement and so on. The end cap 4 is composed of end cap major parts 44 to define curved outside halves of the turnaround passages 30 and spacer parts 45 that fit into recesses in the end cap major parts 44 to define curved inside halves of the turnaround passages 30. Moreover, the balls 5 while rolling through raceway grooves 12 on the carriage 3 are guided and retained with retainer bands 35 so as not to fall apart from the slider even after the slider 2 has been demounted from the guide rail 1.

The linear motion guide unit of the present invention especially features the end seal 6 which is made up of the core member 8 of metallic plate rich in rigidity or stiffness and elastic member 7 secured to the metallic core 8, the elastic member 7 including the lip portion 19 of double-lip type composed of the outside lip 21 and the inside lip 22 united at their pedestals in a root portion 31 which is secured to the metallic core 8. With the end seal 6, more especially, the metallic core 8 as shown in FIGS. 6 to 9 is embedded in the root portion 31 lying on center lines CL in transverse sections of the outside lip 21 and the inside lip 22. As a result that the metallic core 8 bears forces or stress exerted respectively on the center lines CL of the outside lip 21 and the inside lip 22, the lips 21 and 22 can be preserved in shape to exclude dirt outward while to retain lubricant inward. Moreover, the end seal 6 has an inverted U-shape flat contour defined with a pair of the bulges 24 lying in opposition to the sides 9 of the guide rail 1 and the upper connecting portion 23 lying in opposition to the top surface 10 of the guide rail 1 and connecting the bulges 24 with each other. The lip portion 19 made up of the outside lip 21 and the inside lip 22 constituting the lip portion 19 is made of the elastic member 7 which is formed correspondingly to the guide rail 1 along an edge around a U-shaped recess in the end seal 6. With the end seal 6 constructed as stated earlier, the metallic core 8 at the innermost end thereof is secured to the root portion 31 of the outside lip 21 and the inside lip 22 to direct the lips to the guide rail 1 and, therefore, the outside lip 21 and the inside lip 22 are born together against the metallic core 8 throughout the inside edge of the around the U-shaped recess to be tougher to suffer deformation even encountered with great sliding resistance.

Figure 15:
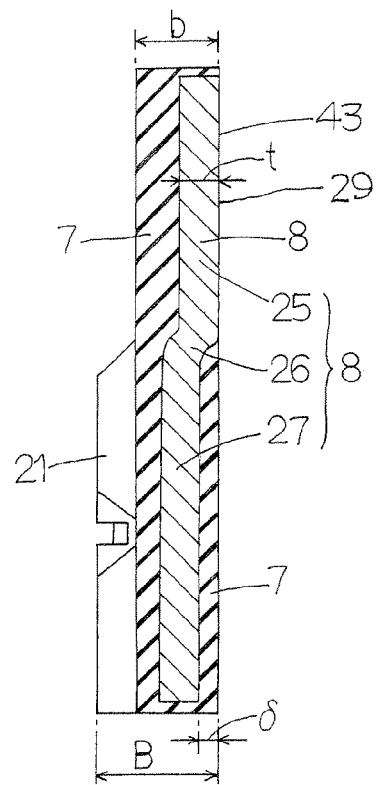
FIG. 15 is a view in transverse section of the end seal, the view being taken on a plane lying on the line X V-X V of FIG. 12.
Figure 20:
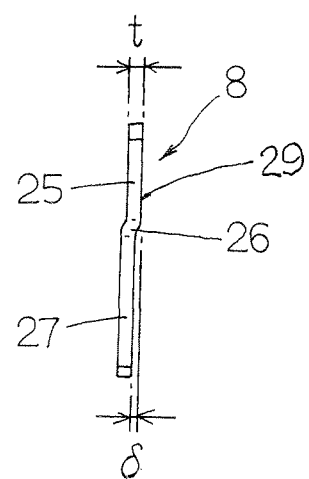
FIG. 20 is a view in side elevation of the metallic core for the end seal of the linear motion guide unit of the present.

The metallic core 8 in the end seal 6 as shown in FIGS. 15 and 20 is composed of a mounting portion 25 lying along the upper connecting portion 23 of the end seal 6 and having a mounting surface 29 to come into abutment against the outward end surface 14 of the end cap 4, and a bent portion 26 lying along the upper connecting portion 23 of the end seal 6, but biased or deflected more outward of the slider 2, and a lip-support portion 27 lying on a plane biased from the mounting surface 29 and extended from the bent portion 26 along the bulges 24 of the end seal 6 in parallel with the mounting surface 29. With the metallic core 8 for the end seal 6 constructed as stated earlier, the mounting portion 25 has the mounting surface 29 to come into abutment against the outward end surface 14 of the end cap 4, and the lip-support portion 27 is biased or deflected away from the mounting portion 25 and extended from the bent portion 26 into the bulges 24 in parallel with the mounting surface 29. As a result of the metallic core 8 constructed as stated earlier, a location on which the lip portion having the outside lip 21 and the inside lip 22 is formed lying in parallel with the mounting surface 29 and, therefore, the lip portion 19 may be made firmly with ease on the lip-support portion 27. On the major area or the major body 18 excluding the lip portion 19 in the end seal 6, moreover, the elastic member 17 is made in a platy contour having opposite surfaces lying in parallel with each other. As a result of the contour as stated just earlier, the elastic member 7 may be finished by only manufacturing plate contour having opposite surfaces lying in substantially parallel with each other. Thus, the elastic member 7 is easier to manufacture and simpler in construction than ever. With the lip portion 19, moreover, the outside lip 21 protrudes out of the outward surface of the plate contour while the inside lip 22 recedes more backward than an inside surface or inside end surface 43 of the plate contour. Thus, the linear motion guide unit of the present invention may be made easier and simpler as a whole in construction and further the inside lip 22, even if encountered with any sliding resistance, will suffer no interference with end cap 4.

Figure 6:
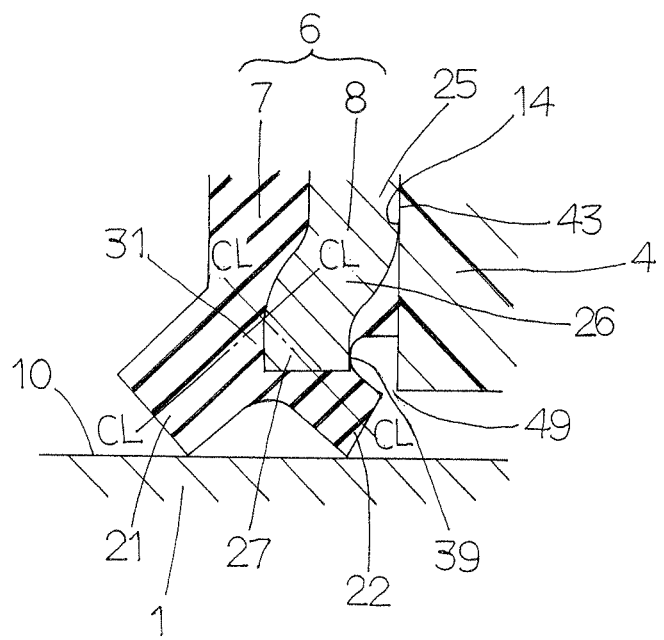
FIG. 6 is a fragmentary view in transverse section of the linear motion guide unit of FIG. 5, the view being taken on a plane lying on the line VI-VI of FIG. 5 to show in detail a geometric relation between the end seal and the top surface of the guide rail.
Figure 7:
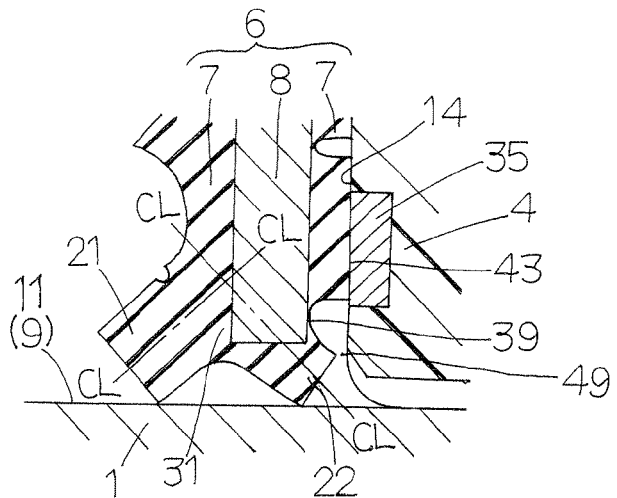
FIG. 7 is a fragmentary view in transverse section of the linear motion guide unit of FIG. 5, the view being taken on a plane lying on the line VII-VII of FIG. 5 to show in detail a geometric relation between the end seal and a raceway groove on the guide rail.
Figure 8:
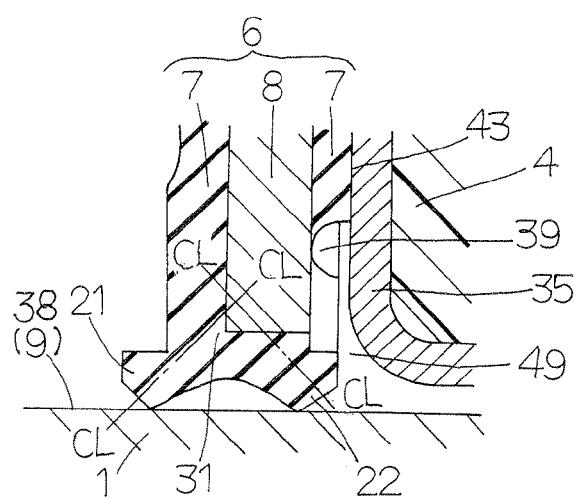
FIG. 8 is a fragmentary view in transverse section of the linear motion guide unit of FIG. 5, the view being taken on a plane lying on the line VIII-VIII of FIG. 5 to show in detail a geometric relation between the end seal and a groove into which a retainer fits on the guide rail.
Figure 9:
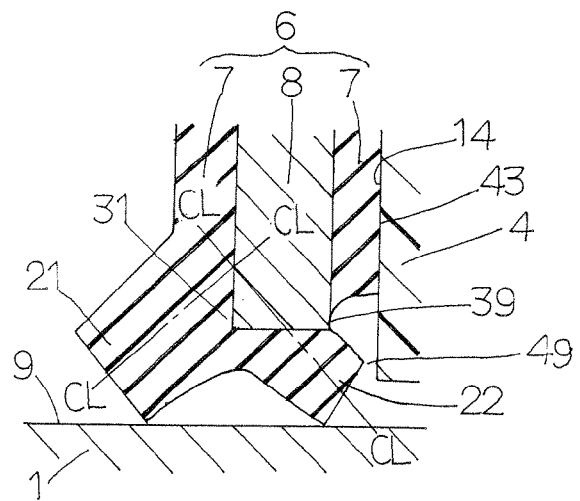
FIG. 9 is a fragmentary view in transverse section of the linear motion guide unit of FIG. 5, the view being taken on a plane lying on the line IX-IX of FIG. 5 to show in detail a geometric relation between the end seal and a side on the guide rail.

The metallic core 8 has a thickness t of, for example a matter of 0.8 mm throughout the overall length of the mounting portion 25, bent portion 26 and the lip-support portion 27. Moreover, the lip-support portions 27 lies on a plane biased from the mounting surface 29 by an amount of δ. As a result that the metallic core 8 is biased at the bent portion 26 more outwardly than the mounting portion 25, the inside lip 22 on the end seal 6 is spaced away from the outward end surface 14 of the end cap 4 to keep the foremost end of the inside lip 22 on the end seal 6 against interference or abutment with the outward end surface 14 of the end cap 4. The elastic member 7 has a groove 39 just above the inside lip 22 to isolate or protect the major body 18 from the elastic deformation initiated on the inside lip 22. Furthermore, the metallic core 8 for the end seal 6 has holes 28 counterbored at 42 which are used to fasten the end seal 6 to the outside end surface 14 of the end cap 4, and another hole 28G with counterbored at 42G which is used to mount a grease nipple to the end seal 6. The outside lip 21 on the end seal 6, as shown in FIGS. 6, 7, and 9, is made thicker in transverse section than the inside lip 22 lying nearer to the metallic core 8 than in the outside lip 21, thereby tougher in elastic deformation than the inside lip 22. Moreover, the outside lip 21 as extending more distant than the inside lip 23 is made to suffer or endure the sliding resistance or any external force which would be encountered to exclude foreign matter adhered on the surface of the guide rail.

Figure 14:
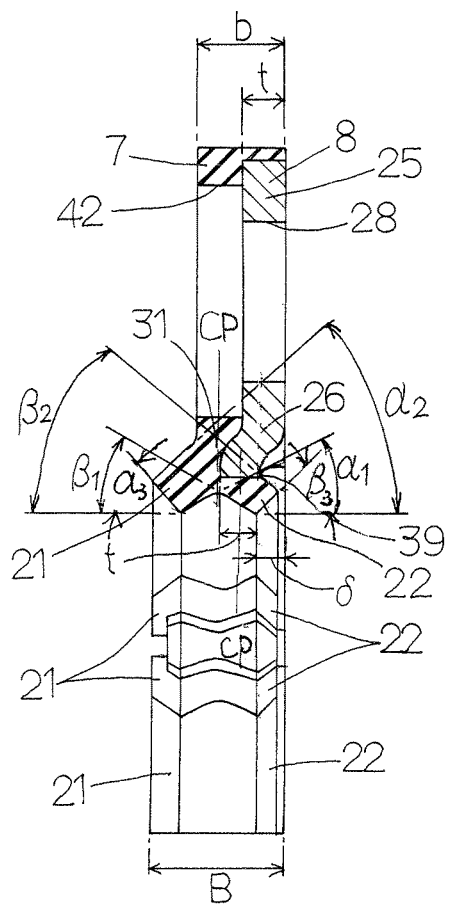
FIG. 14 is a view in side elevation of the end seal, the view including a view in transverse section taken on a plane lying on the line X IV-X IV of FIG. 12 to show in detail how the lips lying inside the downward bulge tilt relative to the guide rail.

The lip portion 19 of the end seal 6 as shown in FIG. 14 is made aslant or inclined with respect to any one of the top surface 10 and the opposite sides 9 of the guide rail 1. In detail, inclined angles or tilt angles ($\alpha_1$, $\alpha_2$) along a sole surface and an upper surface of the outside lip 21 are made identical with inclined angles or tilt angles ($\beta_1$, $\beta_2$) along a sole surface and an upper surface of the inside lip 22 respectively. More especially, the inclined angle $\alpha_1$ between the sole surface of the outside lip 21 and the surface of the guide rail 1 and the inclined angle $\alpha_2$ between the upper surface of the outside lip 21 and the surface of the guide rail 1 were equally set at about 35°, while the inclined angle $\beta_1$ between the sole surface of the inside lip 22 and the surface of the guide rail 1 and the inclined angle $\beta_2$ between the upper surface of the outside lip 22 and the surface of the guide rail 1 were equally set at about 45°. With the lip portion 19 constructed as stated earlier, moreover, an inclination $\alpha_3$ of an edge surface of the outside lip 21 of the lip portion 19 and an inclination $\beta_3$ of an edge surface of the inside lip 22 are made different from each other. More especially, the inclination $\beta_3$ between the edge surface of the inside lip 22 and the surface of the guide rail 1 is determined larger than the inclination $\alpha_3$ of the edge surface of the outside lip 21. As a result, the lubricant may be easily scraped away from the surface of the guide rail 1 and excluded outside of the slider 2. The foremost edge of the inside lip 22 is set back towards the outside lip 21 away from the outside end surface 14 of the end cap 4 to make a gap 49 between the foremost edge of the inside lip 22 and the outside end surface 14 of the end cap 4. More especially, the gap 49 was set in a matter of 0.1 mm in interval. Thus, even if the inside lip 22 of the end seal 6 has suffered any deformation while the slider 2 moves on the guide rail 1, the foremost edge of the inside lip 22 would make no interference with the outside end surface 14 of the end cap 4. With the lip-support portion 27 of the metallic core 8 in the end seal 6, in addition, a center line CP in a thickness of the metallic core 8 is out of line with another center line CP of the root portion 31 of the inside lip 22 and the outside lip 21 united together to get biased towards the inside lip 22. As a result, the inside lip 22 is better born against the metallic core 8.

Figure 18:
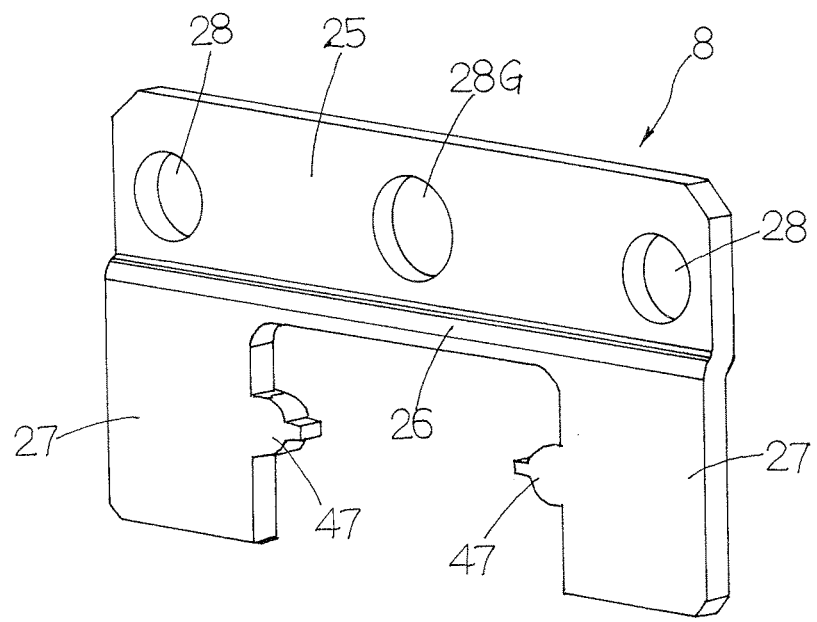
FIG. 18 is a view in perspective showing a metallic core for the end seal of the linear motion guide unit of the present invention.
Figure 19:
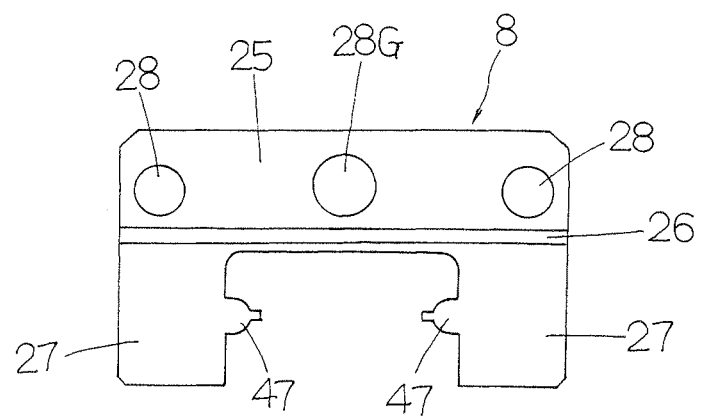
FIG. 19 is a view in front elevation of the metallic core for the end seal of the linear motion guide unit of the present invention.

The linear motion guide unit of the present invention has the end seals 6 disposed on the opposite ends of the slider 2 and each composed of the metallic core 8 and the elastic member 7 of rubber and so on constructed as stated earlier. As the metallic core 8 as shown in FIGS. 18 to 20 is bent in a transverse section to have two stepwise flat portions, one of which lies opposing to the top surface 10 of the guide rail 1 while the others are opposite to the sides 9 of the guide rail 1. The foremost edge of the metallic core 8 extends nearby the edge of the lip portion 19 and further extends to form protrusions 47 reaching in the deep-grooves 48 on the guide rail 1 to give an adequate strength and resistance to the lip portion 19, especially, inside lip 22. Both the outside lip 21 and the inside lip 22 are formed with grooves 46 of roughly rectangular shape in correspondence with grooves 38 for the retainer band to relieve the deformation of the lips. With the linear motion guide unit constructed as stated earlier, the outside lip 21 is made thicker than the inside lip 22 everywhere other than the locations of the grooves 38 for the retainer band to endure the external force exerted on the outside lip 21. The metallic core 8 in the end seal 6 at the location excepting the top surface 10 of the guide rail 1 has a transverse contour extending straightly. The lip portion 19 in the end seal 6 is designed to have the interference with respect to the guide rail 1, the interference being substantially equal in amount for the outside lip 21 and the inside lip 22.

Figure 12:
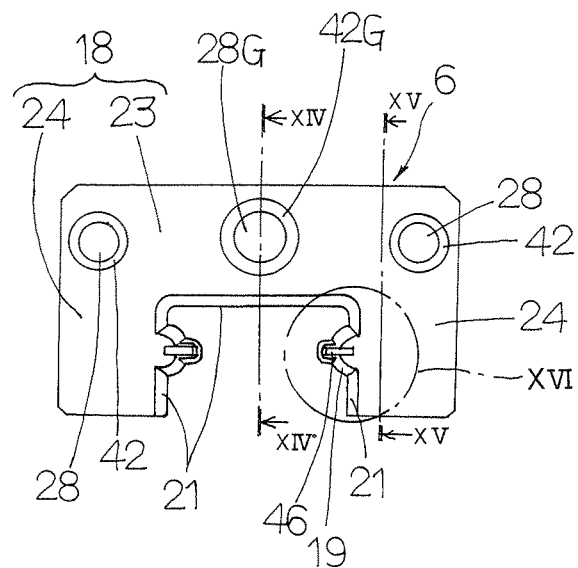
FIG. 12 is a view in front elevation showing the end seal for the linear motion guide unit of the present invention, the end seal being depicted to show an upper major portion and downward bulges to form the outside lip.
Figure 13:
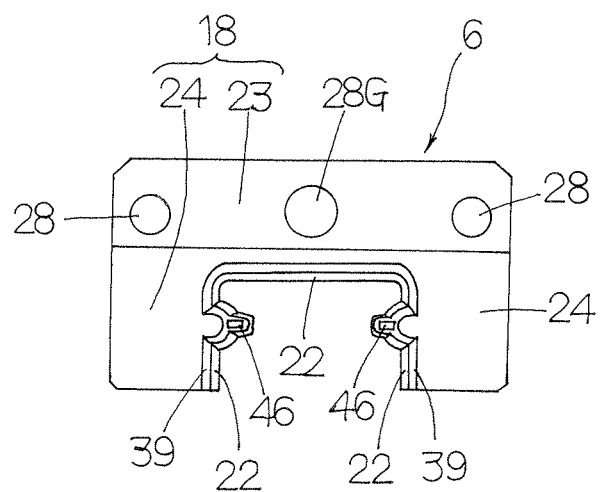
FIG. 13 is a view in rear elevation showing the end seal for the linear motion guide unit of the present invention, the end seal being depicted to show an upper major portion and downward bulges to form the inside lip, in which a metallic core is exposed to provide a mounting surface to the end cap and everything else is made of an elastic member.
Figure 16:
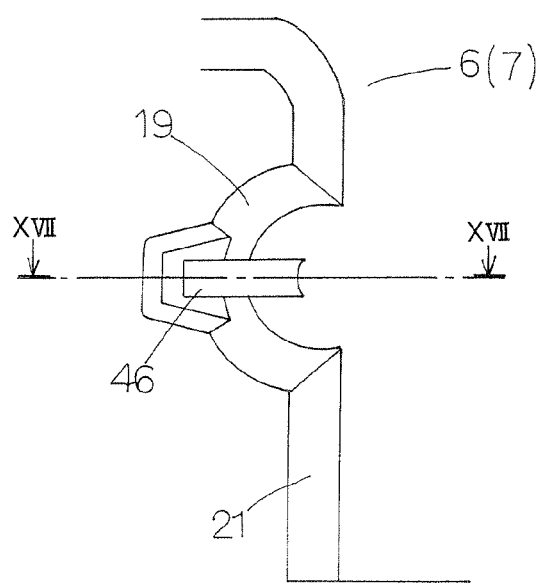
FIG. 16 is an enlarged fragmentary view showing an area encircled with X VI of the end seal in FIG. 12.
Figure 17:
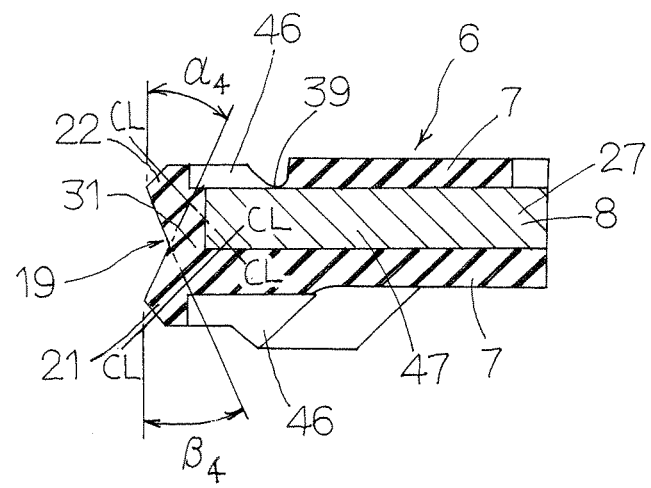
FIG. 17 is an enlarged fragmentary view in transverse section of the end seal, the view being taken on a plane lying on the line X VII-X VII of FIG. 16.

In FIG. 16, there is shown an enlarged view of an area H in FIG. 12 to illustrate the lip portion 19 of the end seal 6, which is in opposition to the raceway groove 11 of the guide rail 1. FIG. 17 is a fragmentary view in transverse section of the end seal 6 to show the lip portion 19 at a location of the deep-groove 38 for the retainer band (see FIG. 2), the view being taken on a plane lying on the line XVII-XVII of FIG. 16. With the end seal 6 constructed as stated earlier, both the outside lip 21 and the inside lip 22 have the grooves 46 to relieve the deformation of the lips. The grooves 46 to relieve the deformation of the lips also may serve as oil sumps to temporarily retain lubricant 41 collected by the inside lip 22. With the lip portion 19 fit into the deep-groove 38 for the retainer band on the guide rail 1, an inclined angle $\alpha_4$ of the outside lip 21 with respect to the bottom of the deep-groove 38 is substantially equal with an inclined angle $\beta_4$ of the inside lip 22 with respect to the bottom surface of the deep-groove 38. More especially, an inner surface of the outside lip 21 or a tilt surface the outside lip 21 coming face-to face with the bottom of the deep-groove 38 makes the inclined angle $\alpha_4$ with the bottom surface of the deep-groove 38, while an inner surface of the inside lip 22 or a tilt surface the inside lip 22 coming face-to-face with the bottom of the deep-groove 38 makes the inclined angle $\beta_4$ with the bottom surface of the deep-groove 38. The inclined angle $\alpha_4$ of the outside lip 21 and the inclined angle $\beta_4$ of the inside lip 22 are set equally at 23.5°. Thus, the inclined angles of the lips 21, 22 are set greater or wider in the deep-groove 38 to make sure of strong stiffness or strength than in other locations around the guide rail 1. Thus, as the deep-groove 38 for retainer band is narrow in width and therefore the lip portion 19 is suffered to three directional forces, the lip portion 19 is forced to become less in angles to ensure a space enough to embed the metallic core 8 in the elastic member 7. With the end seal 6 constructed as stated earlier, the metallic core 8 reaches near the foremost end of the lip portion 19, or the outside lip 21 and the inside lip 22, thereby to reinforce the lip portion 19 lying in the deep-groove 38 for the retainer band.

Figure 21:
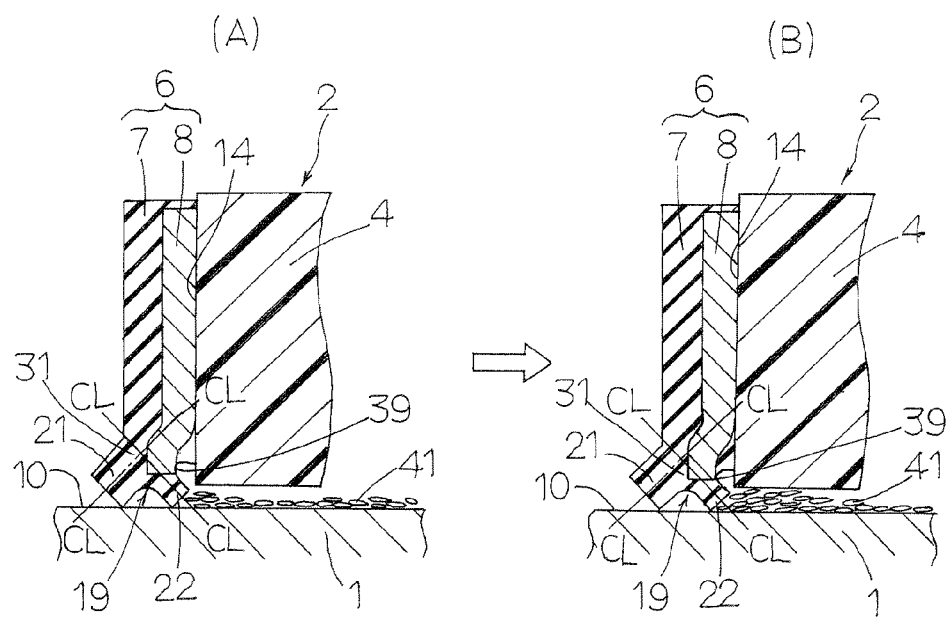
FIG. 21 is an enlarged fragmentary view in transverse section of the end seal equipped on the liner motion guide unit of the present invention when the slider equipped with the end seal moves.
Figure 22:
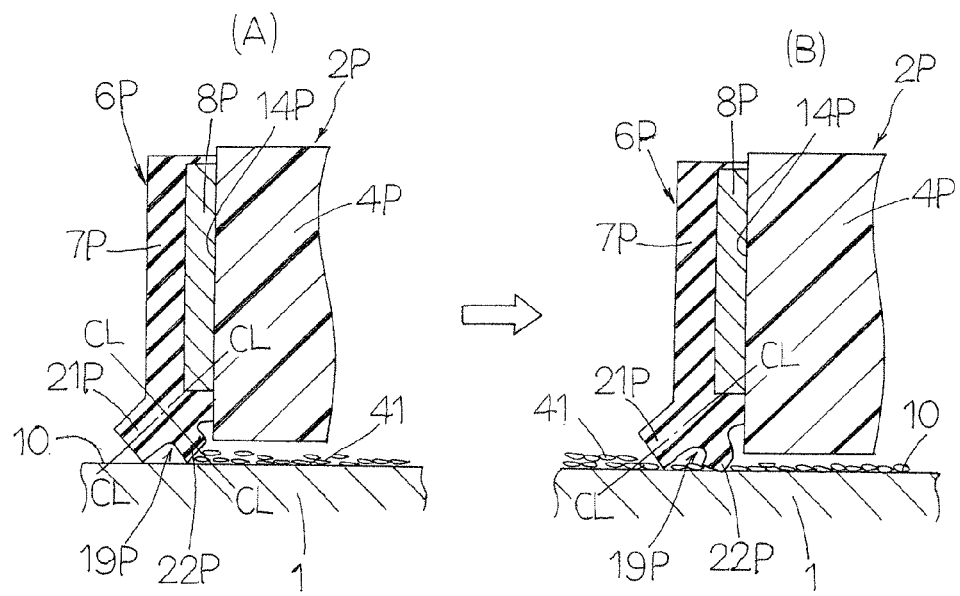
FIG. 22 is the same view as FIG. 21 in the prior art.

With the linear motion guide unit of the present invention, the inside lip 22 of the lip portion 19, because of born against the metallic core 8 lying on the center line CL of the inside lip 22 as shown in FIG. 21(B), increases in stiffness or rigidity so as to become tougher to suffer the deformation while the slider 2 with the end seals 6 moves in sliding manner on the guide rail 1. Thus, the lubricant 41 clinging to the surface of the guide rail 1 may be easily scraped away and further keep the lubricant 41 against leakage out of the slider 2. More especially, the inside lip 22, as born or supported against the metallic core 8, is more enhanced in stiffness or rigidity to get tougher against deformation, as compared with the prior inside lip 22P, see FIG. 22. As a result, the inside lip 22 as the slider 2 moves on the guide rail 1 scrapes the lubricant 41 from the surface of the guide rail 1 with leaving an amount of lubricant 41 enough to protect the surface of the guide rail 1 against lubricant shortage, but keeping the lubricant 41 against leakage out of the slider 2 thereby making for much longer maintenance-free operation for lubrication.

With the prior linear motion guide unit, as opposed the above, when the lubricant 41 is scraped off from the guide rail 1 with the interference of the end seal 6P with the guide rail 1, the inside lip 22P of the lip portion 19P suffers much sliding frictional resistance that is encountered when two solid surfaces slide over each other, thereby sometimes turning over towards the direction opposite to the normal direction, see FIG. 22(B). After the inside lip 22 has turned over as shown in FIG. 22(B), the lubricant 41 isn't scraped away completely, but left on the surface of the guide rail 1 outside of the slider 2, with consequence that the outside lip 21 forces the remaining lubricant 41 outside the slider 2 out of the stroke range of the slider 2P. The lubricant 41 excluded out of the slider 2 couldn't be recovered and therefore would cause environmental contaminant. With the prior linear motion guide unit constructed a stated earlier, as much lubricant is consumed uselessly, there is a possibility that the lubricant shortage causes the premature breakage of the linear motion guide unit.

Although but the linear motion guide unit explained above had the guide rail 1 of a matter of 12 mm wide and the balls 5 for rolling element, it will be appreciated that rollers may be used instead of balls. Moreover, there is no limit to any type, contour, size and so on of the guide rail 1 and the slider 2. The end cap 4 has a recess, not shown, on any one end surface thereof to receive therein a lubricant reservoir plate impregnated with lubricant.

For example, the end cap 4 on one end surface facing the end surface 13 of the carriage 3 has a recess, not shown, to fit over the lubricant reservoir plate, not shown, of porous or cellular compact of sintered resinous material. The lubricant reservoir plate has a nose exposed to an opening in the turnaround passage 30. With the linear motion guide unit constructed as stated earlier, thus, the balls 5 while rolling through the turnaround passage 30 are coated with lubricant from the lubricant reservoir plate and then the load-carrying race 20 is supplied with lubricant while the balls 5 coated with lubricant roll through the load-carrying race 20. As a result, the linear motion guide unit of the present invention irrespective of compact in construction and short in length is made in favor of maintenance-free for lubrication.

What is claimed is:
1. A linear motion guide unit, comprising:
a guide rail having longitudinal sides each of which has a first longitudinal raceway groove,
a slider allowed to move on the guide rail in a sliding manner via more than one roller,
the carriage disposed on the slider and having second raceway grooves extending in opposition to the first raceway grooves on the guide rail to define load-carrying races between the first raceway grooves and the second raceway grooves and return passages extending parallel to the second raceway grooves,
end caps fastened on forward and aft end surfaces of the carriage, one to each end surface, and provided therein with turnaround passages to join together the load-carrying races and the return passages,
end seals being attached on outward end surfaces of the end caps to close clearances between the guide rail and the end caps,
said rolling elements which are allowed to roll through circulating circuits made up of the load-carrying races, the return passages and the turnaround passages,
wherein each of the end seals are composed of a metallic core of metal plate and an elastic member is adhered to the metallic core, the elastic member being composed of a major body and lip portion integral with the major body and opposing to the guide rail to come into sliding engagement or contact with a top surface and the longitudinal sides of the guide rail,
wherein the end seals each is made of an inverted U-shape plate having a pair of side bulges lying in opposition to the longitudinal sides of the guide rail, one to each side, and an upper connecting portion lying in opposition to the top surface of the guide rail and connecting the side bulges with each other,
the lip portion has an outside lip extending outside of the slider and an inside lip extending inside of the slider to make sliding engagement or contact with the guide rail, the outside lip and the inside lip being united at their pedestals in a root portion in which the metallic core is embedded in such a relation lying on center lines in transverse sections of the outside lip and the inside lip, and wherein the metallic core has holes which are used to fasten the metallic core to the outward end surface of the end cap, a mounting portion lying along the upper connecting portion of the end seal and having a mounting surface to come into abutment against the outward end surface of the end cap, a bent portion lying linearly along the upper connecting portion of the end seal across an overall width of the metallic core, and a lip-support portion lying on a plane biased from the mounting surface and extended from the bent portion along the bulges of the end seal in parallel with the mounting surface, whereby the metallic core bears or supports forces or stress exerted respectively on the center lines of the outside lip and the inside lip.

2. A linear motion guide unit constructed as defined in claim 1, wherein the outside lip and the inside lip of the end seal are formed along an inward edge of the inverted U-shape plate of the elastic member to come into engagement with the top surface and the sides of the guide rail.

3. A linear motion guide unit constructed as defined in claim 2, wherein the end seal other than the lips has opposite surfaces extending in parallel with each other, and wherein the outside lip of the lips is raised outside above an outside surface of opposite surfaces of the plate and the inside lip of the lips is retracted more inwardly than an inside surface of opposite surfaces of the plate.

4. A linear motion guide system constructed as defined in claim 2, wherein the metallic core is secured to the root portion of the outside lip and the inside lip to direct the outside lip and the inside lip to the guide rail, so that the outside lip and the inside lip are born together against the metallic core throughout the inward edge of the elastic member.

5. A linear motion guide unit constructed as defined in claim 1, wherein a center line in a thickness of the lip-support portion of the metallic core is out of line with another center line of the root portion where the inside lip and the outside lip are united together and gets biased towards the inside lip.

6. A linear motion guide unit constructed as defined in claim 1, wherein the lip-support portion of the metallic core is biased or deflected outwards away from the mounting portion to make no abutment against the outward end surface of the end cap, and wherein the elastic member has a groove just above the inside lip to isolate or protect the inside lip from interference with the end cap after the inside lip has been suffered to elastic deformation.

7. A linear motion guide unit constructed as defined in claim 1, wherein the outside lip on the end seal is thicker in transverse section than the inside lip.

8. A linear motion guide unit constructed as defined in claim 1, wherein inclined angles or tilt angles ($\alpha_1, \alpha_2$) along a sole surface and an upper surface of the outside lip are set identical with inclined angles or tilt angles ($\beta_1, \beta_2$) along a sole surface and an upper surface of the inside lip, respectively.

* * * * *